United States Patent
Coate (10) Patent No.: US 11,036,021 B2
(45) Date of Patent: *Jun. 15, 2021

(54) APPARATUS AND METHOD FOR SPLICING ALL-DIELECTRIC SELF-SUPPORTING FIBER OPTIC CABLE

(71) Applicant: Brian D. Coate, Tullahoma, TN (US)

(72) Inventor: Brian D. Coate, Tullahoma, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,771

(22) Filed: Feb. 10, 2020

(65) Prior Publication Data

US 2020/0183117 A1 Jun. 11, 2020

Related U.S. Application Data

(63) Continuation of application No. 15/006,948, filed on Jan. 26, 2016, now Pat. No. 10,585,260, which is a continuation of application No. 13/261,949, filed on Sep. 9, 2014, now Pat. No. 10,379,308, which is a continuation of application No. PCT/US2013/032890, filed on Mar. 19, 2013.

(60) Provisional application No. 61/612,863, filed on Mar. 19, 2012.

(51) Int. Cl.
| | |
|---|---|
| G02B 6/44 | (2006.01) |
| G02B 6/245 | (2006.01) |
| G02B 6/25 | (2006.01) |
| G02B 6/255 | (2006.01) |

(52) U.S. Cl.
CPC ........... *G02B 6/4467* (2013.01); *G02B 6/245* (2013.01); *G02B 6/25* (2013.01); *G02B 6/255* (2013.01); *G02B 6/4422* (2013.01); *G02B 6/4477* (2013.01); G02B 6/4454 (2013.01)

(58) Field of Classification Search
CPC ........ G02B 6/4467; G02B 6/255; G02B 6/25; G02B 6/4422; G02B 6/245; G02B 6/4477; G02B 6/4454
See application file for complete search history.

(56) References Cited

U.S. PATENT DOCUMENTS 10,379,308 B2 * 8/2019 Coate ............... G02B 6/255

* cited by examiner

*Primary Examiner* — Ryan A Lepisto (57) ABSTRACT

An apparatus and method for accessing and/or repairing a select subset of fibers in an ADSS fiber optic cable. The apparatus includes a housing extending from a first end to a second end. A first fiber optic splice tray is positioned within the housing closer to the first end than to the second end. A second fiber optic splice tray is positioned within the housing and spaced apart from the first splice tray. A tension member extends through the housing and includes a first mechanical connector near the first end and a second mechanical connector near the second end. The connectors provide an attachment location for deadends at either end for transferring tension from the undamaged portion of the ADSS fiber optic cable.

17 Claims, 8 Drawing Sheets

APPARATUS AND METHOD FOR SPLICING ALL-DIELECTRIC SELF-SUPPORTING FIBER OPTIC CABLE

CROSS-REFERENCE TO RELATED APPLICATIONS

This application is a continuation of U.S. Ser. No. 15/006,948, now U.S. Pat. No. 10,585,260, entitled "Apparatus And Method For Splicing All-Dielectric Self-Supporting Fiber Optic Cable" filed Jan. 26, 2016 that is in turn a continuation of U.S. Ser. No. 13/261,949, now U.S. Pat. No. 10,379,308 B2, entitled "Apparatus And Method For Splicing All-Dielectric Self-Supporting Fiber Optic Cable" filed Sep. 9, 2014 that is the National Stage of International Application No. PCT/US2013/032890 entitled "Apparatus And Method For Splicing All-Dielectric Self-Supporting Fiber Optic Cable" filed 19 Mar. 2013, which claims the benefit of U.S. Provisional Patent Application No. 61/612,863 entitled "Apparatus And Method For Splicing All-Dielectric Self-Supporting Fiber Optic Cable" filed 19 Mar. 2012. The entire contents and disclosures of these related applications are hereby incorporated herein by reference.

FIELD OF THE INVENTION

This invention relates to an apparatus and method for splicing all-dielectric, self-supporting (ADSS) fiber optic cable.

BACKGROUND OF THE INVENTION

Figures 1, 2:
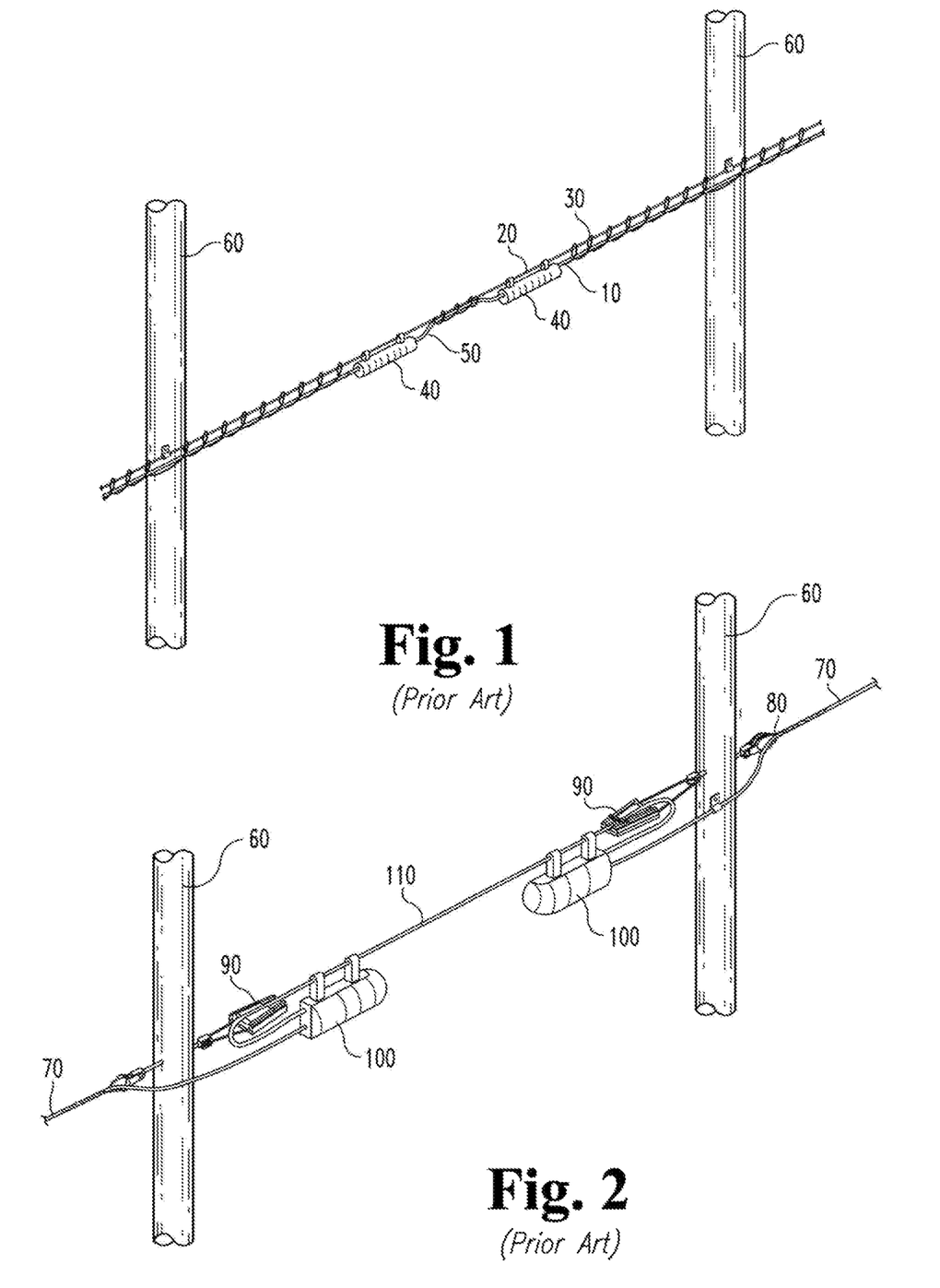
FIG. 1 illustrates a prior art strand-and-lash installation of fiber optic cable where the cable is supported by and lashed to a steel messenger.
FIG. 2 illustrates a prior art ADSS cable installation including a repair made using a prior art apparatus.

Fiber optic cables are widely used in communications systems. Communications services provided over fiber optic cables are typically either supported by a steel messenger strung between structures ("strand and lash" method), or are of a self-supporting nature using internal strength members. With reference to FIG. 1 there are illustrated aspects of a prior art "strand and lash" installation. Fiber optic cable 10 is supported by a steel messenger 20 strung between support structures 60. The fiber optic cable is physically secured to the steel messenger 20 using a lashing wire 30. This lashing wire is usually made of aluminum or steel. The lashing wire is, wrapped around both the fiber optic cable and the messenger, and is usually conductive. FIG. 1 also illustrates splice closures 40 that can be mounted inline, and a short section of repair fiber 50 between the two closures.

All-dielectric, self-supporting (ADSS) fiber optic cable contains no metal or electrically conductive material, and has the capability of supporting its own suspension. Aramid yarns or other non-metallic strength members are arranged so that the tensile load of the cable is applied to the strength members and not the optical fibers. Therefore no separate steel messenger is required. Because the sheath and strength members are integral to the cable's strength carrying ability, the integrated cable must be relieved of tension before the sheath can be cut (which is required to access internal fibers), Devices that are used to connect the cables to supporting structures must grip the cables in a manner such that the tensile load, from the cable is properly transferred from the cable strength members through the cable sheath to the supporting apparatus, without damaging the internal optical fibers.

FIG. 2 illustrates an ADSS fiber optic installation, whereby ADSS fiber optic cable 70 is supported by a series of support structures 60, typically utility poles. At each location where access to the fiber is required, the cable is dead-ended (an industry term meaning that the cable tension is transferred to a supporting structure) using a device that is of varying design. For example, FIG. 2 illustrates two such designs: a wedge type deadend 90 and a wire wrap "preform" style 80. The wedge type deadend uses a fixed outer bracket with a sliding wedge that transfers line tension into the wedge, effectively gripping the cable on two sides. One example of a wedge type deadend is that disclosed in U.S. Pat. No. 5,647,046 to Cowen et al. titled "Wedge Deadend to Support Aerial Cables". The wire wrap preform style is similar to a Chinese finger in that the deadend apparatus "grabs" the entire circumference of the cable once it is wrapped around the cable. One example of such a wire wrap preform style is the Fiberlign product(s) manufactured by PLP (Preformed Line Products) of Cleveland, Ohio. The remaining portion of the cable that is not under tension is routed into a splice closure 100. An example of a splice closure 100 is the Coyote Dome products available from Preformed Line Products of Cleveland, Ohio.

ADSS has inherent benefits over lashed systems. Since the ADSS installation only requires the installation of a single cable, the installation method is faster, and therefore less expensive than the installation of a lashed system. Constructing cable is a 3 step process with a strand and lash system. First, the steel messenger is strung between supporting structures and pulled to tension. Second, the fiber optic cable is placed adjacent to the steel messenger cable. Third, a steel wire is "lashed" around both, holding them together. ADSS construction is simply step one: stringing the cable and pulling to tension. ADSS can also be, installed in applications where its dielectric nature is a significant requirement, such, as in the supply zone (where power lines are typically installed) of a jointly used pole line. This has made ADSS cable very attractive for power companies and municipalities that have access and qualified personnel to work within the power supply area of the pole. The metal-free, dielectric design also eliminates the bonding and grounding requirements of the traditional steel supported fiber optics installations.

ADSS cable also has drawbacks. Most notably, the cable itself holds the tension required to stay suspended. Consequently, accessing the fiber within the cable currently requires a dead-end assembly that can hold the line tension while giving access to the internal fibers. In contrast, again referring to the traditional strand and lash arrangement of FIG. 1, a cable damaged mid-span is illustrated as repaired by attaching two splice closures 40 and a short section of repair fiber 50 between the two closures. This would usually require breaking all of the fibers within the cable and re-splicing original cable on both ends to repair the cable.

A variety of factors can cause damage to fiber optic cables, including inclement weather, vehicle accidents, tree branches, malicious or inadvertent human-related damage, and animal-related damage (such as squirrels chewing through the sheath of a cable). All of these would result in damaging the fibers therein. Current techniques for repairing mid-span damage to the ADSS cable, however, generally require completely severing and dead-ending the cable at two adjacent structures and placing two splice closures, and the replacement of the entire span of fiber optic cable. FIG. 2 depicts a known ADSS fiber optic installation after the repair of mid-span damage. The ADSS fiber optic cable 70 is dead-ended at the structures adjacent to the damage. A repair section 110 is then constructed between the structures. The original cable 70 is spliced to the repair fiber 110 using traditional closures 100, which are typically attached to either the pole or the sheathed ADSS cable.

While this has historically been an acceptable construction practice in the industry, as larger fiber count cables are in service (often 288 count and up), the labor and material cost of dead-ending and splicing in two places to repair minor mid-span damage can be substantial. The addition of a new span of fiber often requires a construction crew, and the splicing at each end can take a substantial amount of time. For a typical 288 count cable with only a few fibers damaged, this could result in an entire day of construction and several days of splicing. In addition to the cost, since every fiber must be spliced, arrangements must be made to render the cable out of service. Depending on the nature of the communications circuits carried by the fiber optic cable, this could result in downtime costs or penalties.

U.S. Pat. No. 8,001,686 discloses a method of taut sheath splicing of ADSS cable that includes a clamp for connecting to a first portion of the fiber optic cable and a bail for connecting the clamp to a support structure (the utility pole) and a splice closure for splicing a second portion of the fiber optic cable to one or more additional fiber optic cables, and means for connecting the splice closure to the bail (see U.S. Pat. No. 8,001,686—column 1, line 64 to column 2, line 3). One example of splicing two separate cables, together is a drop to a customer (see U.S. Pat. No. 8,001,686—column 1, lines 19-22). In particular, to connect a drop fiber to a customer into an ADSS cable that does not have an existing splice point, but the disclosure of U.S. Pat. No. 8,001,686 requires the presence of a bail and support structure.

There remains a need for a method and apparatus to allow the repair or segregation of a subset of one or more fibers from a larger group within an ADSS cable, preferably also permitting the use of a mid-span device.

SUMMARY OF THE INVENTION

An apparatus for splicing a fiber optic cable in a manner wherein one or more fibers within the sheath can be repaired or otherwise segregated while the remaining fibers can be left in service. The apparatus provides for two splicing compartments separated by at least one enclosed channel for both the repair fiber and the undamaged portion of the cable. One or more embodiments of this invention are particularly applicable to splicing and/or repairing all dielectric, self-supporting (ADSS) fiber optic cable. In one embodiment the apparatus is augmented by a strength member designed to withstand the tension associated with an ADSS cable. In another embodiment the housing defining the spaced apart splicing compartments and enclosed channel connecting the two compartments acts as the tension member and has sufficient strength to withstand the load associated with an ADSS cable.

In an ADSS cable the longitudinal line tension is borne by both the internal strength members and the cable sheath, working together as a system. Since the sheath cannot be opened without jeopardizing the strength of the cable system, it can be referred to as a taut sheath. In one embodiment there is an aerial taut sheath closure that preferably can interoperate with the ADSS deadends currently on the market. Taut sheath splicing of ADSS fiber optic cable can be performed without including any planned extra cable at installation. This invention can be located mid-span, or at a support position, and permits access to select subsets of fibers within a fiber optic cable, even if the cable is self-supporting. This allows for simplified repair and/or easier access in cable installations (i.e. new customers and/or expansion and build-out of an existing fiber network) where no extra cable or pole real estate is available.

In another embodiment, there is an apparatus useful in the repair of a large-count fiber optic cable that has had either sheath damage or light damage to internal fibers. The enclosure can be installed in-line and support full tension, with enough slack created to route the undamaged fibers through a channel of the enclosure, then replacing the damaged fiber with repair fiber (spliced in each end of the apparatus) and then preferably routing damaged fibers through a separate loose fiber pathway.

In another embodiment there is an apparatus for accessing select fibers in an ADSS fiber optic cable. The apparatus includes a housing extending from a first end to a second end, wherein the housing is weather resistant when closed by a lid. A first fiber optic splice tray is positioned within the housing closer to the first end than to the second end. A second fiber optic splice tray is positioned within the housing and spaced apart from the first splice tray. The second tray is closer to the second end than to the first end. The apparatus further includes a tension member extending through the housing and including a first mechanical connector external to the housing near the first end and a second mechanical connector external to the housing near the second end.

In one refinement the housing has an axial length between the first end and the second end that is at least six feet.

In another refinement the tension member is a fiberglass rod.

In another refinement the first mechanical connector is a closed loop and the second mechanical connector is a closed loop.

In another refinement each mechanical connector is attached to the tension member by internal threading that corresponds to external threading present, on at least a portion of the tension member.

In another refinement each mechanical connector is integrally formed with the tension member.

In another refinement the first splice tray is connected to the second splice tray by a plurality of repair fibers.

In another refinement the lid is a hinged lid that opens to permit access to an internal cavity of the housing.

In another refinement the housing defines a first end compartment at the first end in which is the first fiber optic splice tray is positioned and a second end compartment at the second end in which the second fiber optic splice tray is positioned.

In another refinement the housing further defines a body portion connecting the first end compartment to the second end compartment.

In another refinement the body portion defines at least two different chambers that are each open to both the first end compartment and the second end compartment.

In another refinement the body portion defines a first chamber, a second chamber, and a third chamber, and the tension member is positioned within the first chamber.

In another refinement the first splice tray is connected to the second splice tray by a plurality of repair fibers, and the repair fibers are positioned within the second chamber.

In another refinement the housing defines a mounting hole in the body portion.

In another refinement the lid is detachable from the housing to permit access to an internal cavity of the housing.

In another refinement the first end of the housing defines a first channel extending from a location on a first perimeter of the first end to a first internal location on the first end, and the second end of the housing defines a second internal channel extending from a location on a second perimeter of the second end to an internal location on the second end, and the first channel and the second channel are sized to receive a portion of the tension member.

In another refinement the apparatus further includes a seal member positioned at each end of the housing and configured to seal the channel in which the tension member is positioned on each end.

In another refinement the housing defines a first fiber optic cable opening at the first end, and a second fiber optic cable opening at the second end.

In another refinement the apparatus further includes a first cable clamp attached to the housing near the first fiber optic cable opening, and a second cable clamp attached to the housing near the second fiber optic cable opening.

In another refinement the housing defines a recess that contacts the lid when the lid is attached to close the housing, and further includes a seal member attached to one of the lid and the recess of the housing.

In another refinement at least one of the housing and the lid include a plurality of locking connectors.

In another refinement the body portion defines at least two different chambers and includes at least one internal clip configured to position loose buffer tubes of a fiber optic cable. The internal clip is positioned within at least one of the chambers of the body portion.

In another refinement each splice tray is secured by a plurality of clips in a splice closure.

In another embodiment there is a fiber optic cable repair apparatus. The apparatus includes a weather resistant housing having inline spaced apart fiber optic splice trays positioned respectively in a first end compartment, and a second end compartment of the housing. The apparatus further includes a means for retaining tension and connecting to an ADSS fiber optic cable.

In one refinement the means for retaining tension and connecting to an ADSS fiber optic cable comprises a tension member extending through the housing and terminating in a first eyelet connector external to a first end of the housing and a second eyelet connector external to a second opposite end, of the housing.

In another refinement the means for retaining tension and connecting to an ADSS fiber optic cable comprises the housing being constructed to support a load of between 1,000 lbs to 20,000 lbs and further including a first mechanical connector adjacent to the first end compartment and a second mechanical compartment adjacent to the second end compartment.

In another refinement the mechanical connectors are integrally formed with the housing.

In another refinement the housing has an axial length between a first end and a second end that is at least six feet. The housing includes a removable lid to permit access to an internal cavity of the housing. The housing further defines a body portion connecting the first end compartment to the second end compartment.

In another refinement the body, portion defines at least two different chambers, and positioned in only one of the chambers are a plurality of repair fibers that connect the inline spaced apart fiber optic splice trays.

In another refinement the housing defines a recess that contacts the lid when the lid is attached, and further includes a perimeter seal member attached to one of the lid and the recess of the housing.

In another embodiment there is a fiber optic cable repair apparatus comprising a pair of inline spaced apart fiber optic splice trays positioned within a respective pair of end compartments of a weather resistant housing. The housing defines a first channel and a second channel between the end compartments. The apparatus further includes a tension member at least partially positioned within the housing that extends along an entire length of the housing between the end compartments and protrudes from the housing at each end.

In one refinement the tension member terminates in a first eyelet connector external to a first end of the housing and a second eyelet connector external to a second opposite end of the housing.

In another refinement the housing has an axial length between the first end and the second end that is at least six feet. The housing has a removable lid to permit access to an internal cavity of the housing.

In another refinement the housing defines a recess that contacts the lid when the lid is closed, and further includes a seal member attached to one of the lid and the recess of the housing.

In another embodiment there is an ADSS fiber optic cable repair apparatus. The apparatus includes a first splice tray positioned in a closable first compartment. The apparatus further includes a second splice tray positioned in a closable second compartment. The second compartment is spaced apart from the first compartment. The apparatus also includes a sleeve being closable to define a weather resistant internal chamber that fluidly connects a first opening in the first compartment to a second opening in the second compartment. The apparatus further includes a tension member extending between a first end and a second and having a first mechanical connector closer to the first end then the second end, and a second mechanical connector closer to the second end then the first end. The tension member is separately connected to each of the first end compartment and the second end compartment and the sleeve.

In one refinement each end compartment includes a lid and defines a recess with a seal attached thereto that contacts the lid when the lid is closed.

In another refinement the sleeve has an adjustable length.

In another refinement the first end compartment is connected to the second end compartment by a plurality of repair fibers.

In another refinement the plurality of repair fibers extend between a third opening in the first end compartment and a fourth opening in the second end compartment. The plurality of repair fibers are not positioned within the internal chamber of the sleeve.

The present invention also includes various methods of repairing or expanding a fiber optic network using the apparatus of the present invention.

In one embodiment there is a method of repairing mid-span damage in an ADSS fiber optic cable. The method comprises attaching a bridging device that encloses the damaged portion of the cable. The apparatus includes a load bearing member that is connected to a first undamaged portion of the cable and to a second undamaged portion of the cable. The damaged portion of the cable is between the first and second undamaged portions of the cable. The method further comprises removing a portion of an outer sheath of the cable and splicing a subset of a plurality of the fibers through a pair of splice trays enclosed in the bridging device when a lid of the bridging device is closed.

In another embodiment there is a method of accessing a subset of fibers in an ADSS fiber optic cable under tension. The method comprises transferring tension from the ADSS fiber optic cable to a strength member in a housing. Dead-ends are attached on either side of the housing that are connected to connectors at each end of the strength member. The method further comprises positioning the ADSS fiber optic cable in the housing and removing a sheath of the cable from at least a portion of the cable within the housing.

In one refinement the method further comprises repairing damaged fibers in the ADSS fiber optic cable by splicing the damaged fibers through a pair of splice trays positioned in the housing.

In another refinement the method further comprises separating damaged buffer tubes from those that are undamaged, and routing the undamaged buffer tubes through a first channel of a body portion of the housing that connects the pair of splice closures.

In another refinement the method further comprises the step of closing a lid on the housing or attaching a separate lid to the housing.

In another embodiment there is a method of splicing an all-dielectric self-supporting fiber optic cable. The method comprises using a hoist to grip the cable at two points on either side of the location to be repaired. The method further comprises pulling the cable with the hoist such that a small amount of slack is created. The method further comprises installing deadend hardware to connect the cable to the bridging apparatus. The method further comprises extending and removing the hoist, thus transferring the tensile loading to the bridging apparatus. The method further comprises removing the outer sheath of the cable and separating the fibers into those that will not be disturbed and those that need to be accessed. The method further comprises routing those fibers that are not to be disturbed throughout a first channel in the bridging apparatus. The method further comprises cutting and routing the fibers to be spliced into the respective splice trays positioned in end compartments of the bridging apparatus.

In one refinement the method comprises splicing the fibers to be spliced to repair fibers that connected the splice trays.

In another refinement the method comprises splicing at least one of the fibers to be spliced to a departing fiber that is only connected to one of the splice trays, and splicing the remaining fibers in a buffer tube containing that fiber to connecting repair fibers that extend between both splice trays.

In another embodiment there is a method of accessing fibers in an ADSS fiber optic cable. The method comprises transferring tension from the ADSS fiber optic cable to a housing. The method further comprises separating at least one damaged buffer tube of the ADSS fiber optic cable from at, least one undamaged buffer tube of the ADSS fiber optic cable. The method further comprises splicing a plurality of fibers from the damaged buffer tube at each end of the housing to a plurality of repair fibers connecting the ends.

In one refinement the method further comprises the step of closing a lid of the housing or attaching a separate lid to the housing.

In another embodiment there is a method for mid sheath cable access of an ADSS fiber optic cable. The method comprises pulling the cable with a hoist such that a slack portion is created. The method further comprises installing, dead-end materials to connect the cable to a repair apparatus. The method further comprises extending and removing the hoist after transferring the tensile loading from the cable to the repair apparatus. The method further comprises removing an outer sheath of the cable and separating a plurality of fibers therein into those that will not be disturbed and those to be accessed. The method further comprises routing the fibers that are not to be disturbed through a bypass portion, of the repair apparatus. The method further comprises cutting and routing the fibers to be accessed and splicing the accessed fibers into a pair of splice trays positioned in a pair of respective end portions of the repair apparatus. The method further comprises splicing at least one of the fibers to be accessed to at least one departing fiber. The method further comprises splicing the remaining fibers to be accessed to a connecting fiber that extends to the opposing end and splicing the connecting fiber in the opposite end to corresponding exiting fibers.

DETAILED DESCRIPTION OF THE PREFERRED EMBODIMENTS

An ADSS cable includes several buffer tubes (each typically having 12 fibers) and fiberglass fillers that are all wound together. The sheath and internal strength fibers of an ADS S fiber optic cable are integral parts of its self-supporting nature. Thus, there has been no past method to access internal fibers, because the ADSS fiber optic cable was under the strain of supporting itself. The capability of being installed "in-line" with the longitudinal tension of the cable facilitates access to select fibers (or all internal fibers), and thus repair or extension of service to additional fiber optic cables.

Improvements in the repair process are of use in markets, for example, that primarily use ADSS for fiber-to-the-home (FTTH) deployments or fiber to the subscriber applications. Each pre-defined splice location entails deploying extra cable and a storage method. Improvements can reduce material costs and labor effort by allowing the fibers to be repaired and/or separated at any point along the span. The capability of taut sheath splicing decreases the amount of prior planning needed when deploying a network, thereby reducing costs associated with engineering time and increasing the flexibility of the network, while also keeping the inherent benefits of ADSS cable. Another potential benefit in some applications is the ability to repair or access individual fibers of an ADSS cable without disrupting service to other fibers of the same cable, and the customers served by those fibers. This is significant in the fiber-to-the-home market in which the fiber system is commonly designed in a radial fashion, with no loop capability or alternate feed ability. Also, one or more commercial applications might preferably require only a single person to install, thus eliminating the requirement for stringing equipment or additional personnel.

One or more embodiments of this invention include an apparatus for splicing, repairing and/or otherwise gaining access to internal fibers of multi-fiber optical cables at a variety of positions along the cable, including a mid-span position between support structures. One or more embodiments of the present invention are particularly applicable to splicing all-dielectric, self-supporting (ADSS) fiber optic cable. The ADSS cable can include a plurality of optical fibers that can be accessed without severing the ADSS cable or requiring additional slack in the ADSS cable to perform a splice.

Figure 3:
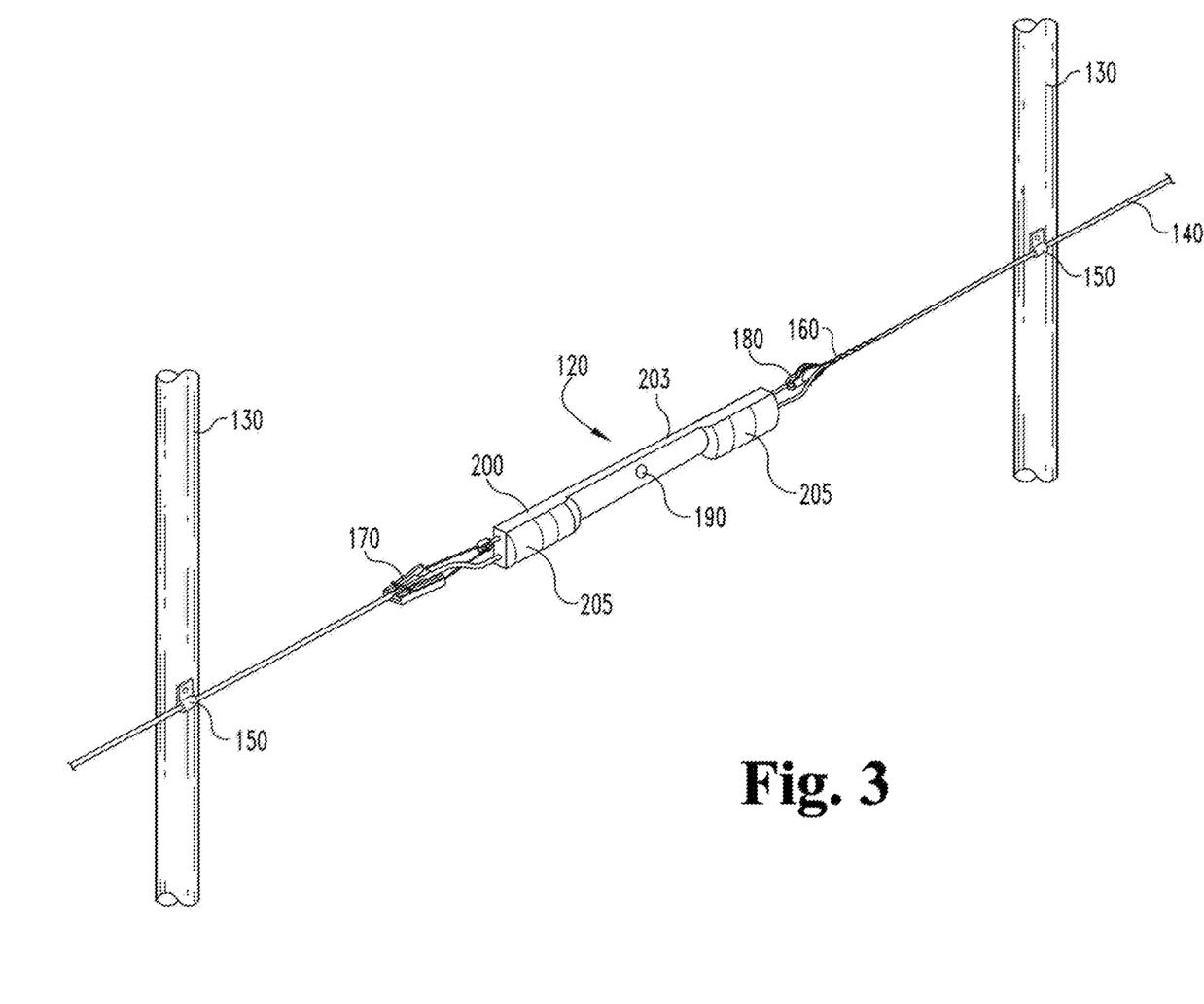
FIG. 3 illustrates an embodiment applied to repair damaged fibers at a mid-span location along the cable between support structures.

With reference to FIG. 3 there is illustrated an apparatus 120 (often referred to herein as a "smartbone" due to its shape) constructed in accordance with one embodiment of the present invention. The smartbone apparatus 120 preferably includes an eyelet 180 at each end suitable for attachment to a gripping device. The eyelet could accommodate, for example, either a wedge type clamp 170 or a pre-formed grip type clamp 160. FIG. 3 illustrates a mid-span construction such that the tangent cable attachments 150 to poles or support structures 130 would not need to be refitted or disturbed.

In one variation, the smartbone apparatus 120 might instead be positioned on a supporting structure 130 using, for example, the mounting hole 190. In this manner the fiber optic cable on either side of the supporting structure could terminate on the smartbone, with the apparatus transferring tensile loading from the fiber optic cable to the supporting structure. The smartbone 120 includes a housing 200 having two splicing compartments 205 separated by a body portion 203. Positioned in body portion 203 are unaffected fiber, repair fiber, and a strength member 210 (see FIG. 4), preferably in separate channels. The apparatus 120 is mounted under tension, with enough slack created to remove the outer cable sheath and route loose fibers through the enclosure.

Figure 4:
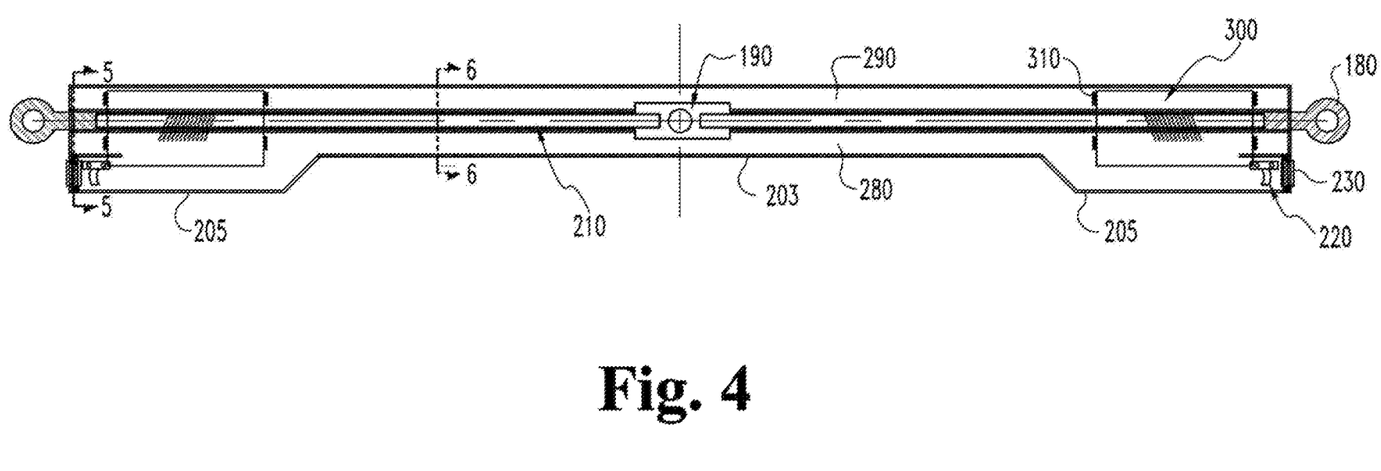
FIG. 4 is a side view of an embodiment illustrating the enclosure interior with no lid present.

With reference to FIG. 4 there are illustrated further aspects of weather resistant housing 200. Housing 200 preferably has a length of approximately six feet in one commercial application. The housing length may vary as appropriate, depending on the application, as is known to those of ordinary skill in the art. The purpose of the length is to provide slack in the fibers to be spliced. The cable tension is transferred onto eyelets 180 using commercially available wedge-type or pre-faulted deadend grips 160 and 170, as illustrated in FIG. 3. It will be understood by those of ordinary skill in the art that other wedge-type grip structures (or other grips such as pre-formed dead-end grips) are contemplated as within the scope of the invention. The cable is preferably positioned such that when the tension is transferred to the smartbone apparatus 120, the cable would be pulled longitudinally from either side of the apparatus such that there could be approximately three to six inches of slack generated across the length of the device. This slack portion of the cable, and all of the cable within the housing 200, would no longer be subject to tensile loading, as the line tension would be transferred to the structural load bearing or strength member 210 (see FIG. 4).

Tension member 210 and the eyelets 180 would be of sufficient strength to withstand all anticipated loading using the design rules of the National Electric Safety Code (NESC), an IEEE standard that specifies design conditions for public utilities, power and communication facilities. Eyelets 180 are merely representative of any of a variety of connector mechanisms for connecting the tension member 210 to the bail or other common deadend apparatus that grips the fiber optic cable. The connector mechanisms might be any of a variety of closed loop structures, whether circular as with the illustrated eyelets 180, or might instead be a polygon shape, or even an open hook structure. It will be understood, however, that closed loop shapes are preferable to open hook structures for reducing the possibility of an inadvertent disconnect. The connector mechanism, such as eyelets 180, could be manufactured from a variety of materials including, but not limited to, fiberglass, steel, aluminum or plastic or other suitable materials known to those of skill in the art. Similarly, the tension member 210 might preferably be a dielectric material such as fiberglass, but could be any appropriate tension bearing material such as steel, aluminum, or plastic. Again, it will be understood by those of ordinary skill in the art that a dielectric material and/or a low weight material are preferred. It is contemplated as within the scope of the invention that the eyelets 180 and the strength member 210 might be manufactured as an integral component, or as separate components. If the tension member and connector mechanism, such as closed loop eyelets, are not integrally made, they might be joined by any of a variety of mechanisms such as a compression fitting, threading, or clamped together.

The portion of the cable that is relieved of tension, and/or the strength members within the cable are preferably secured to the housing via some type of clamp 220. The clamp 220, for example, might be joined to the housing 200 by a threaded connection. The clamp 220 will grasp a portion of the cable inside the housing 200 on which the outer sheath is still present. That is to say, the clamp 220 preferably does not grasp a portion of the ADSS fiber optic cable from which the sheath has been removed for accessing select fibers therein. The clamp 220 would preferably be positioned adjacent to gasket 230 and capture the cable sheath by either encircling the cable in a hose clamp style or, alternatively, using a rounded keeper that would reach across the sheath of the cable and press the cable into a similarly rounded portion of the body. The clamp 220 is intended to keep the slack cable from separating from the apparatus due to normal cable movement. Gasket 230 is weather resistant and keeps moisture from entering the housing and/or exposed internal portions of the cable. Additionally, in some manufacturing methods the housing 200 might be molded around the strength member 200, and such molding around the strength member might preferably be a seal. As illustrated, strength member 210 is positioned within housing 200. It is contemplated as within the scope of the invention that strength member 210, while preferably positioned within the housing 200, is not necessarily positioned within the housing 200 and might instead be external to (and connected to) the housing 200.

Housing 200 includes a body portion or connecting portion 203 between end compartments 205. The body portion 203 preferably defines three separate functional volumes: two splicing channels preferably separated by an intermediate channel. Tension member 210 is preferably positioned within the intermediate channel. The use of distinct channels is preferable, though not necessary, as it assists in keeping the fibers that are "expressed" (a term referring to the industry practice of routing undamaged and/or unbroken cables through a closure without disturbance) through the housing from getting pinched in behind the strength member 210. Similarly, distinct channels keeps the repair fibers from getting pinched in behind the strength member.

Housing 200 could be plastic or any material that is weather and IN resistant, and of sufficient mechanical strength to protect the loose fibers within. It, should be understood that it is contemplated as within the scope of the invention that the housing 200 might be formed with sufficient strength to act as the tension member. If housing 200 were so designed, there would be no need for a separate tension member 210, and eyelets 180 or other connection mechanisms would be formed integrally with, or connected to, the ends of the housing 200. The strength of the housing would depend on the tension of the fiber that depends on the fiber placed and the distance spanned. Typical distribution design tensions (including the NESC safety factor) for the applicable cables can range from 300-1,300 lbs for low count cables (1-72) to 3,000-4,000 lbs for large cables (e.g. 288 count fiber). In applications where the span length exceeds 500 feet, the cable tension under load could approach 10,000 lbs. The preferred implementation would meet typical design criteria with a maximum line tension of at least 3,000 lbs, but there could be commercial implementations with the ability to withstand and sustain substantially higher tensions (up to 20,000 lbs).

Figure 5:
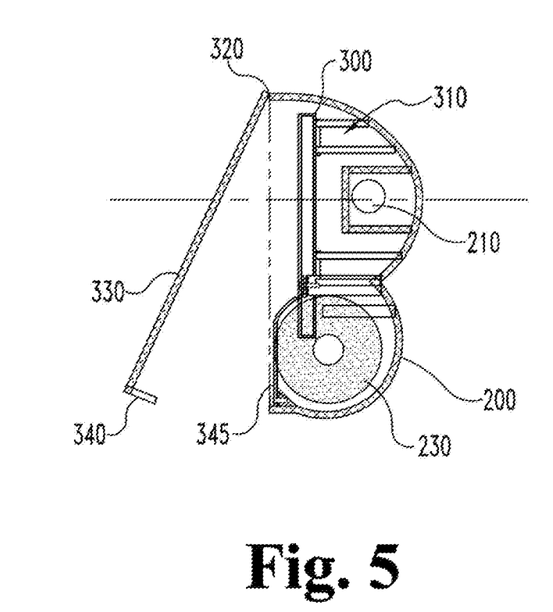
FIG. 5 is a cross sectional view along the 5-5 lines shown in FIG. 4.

With reference to FIG. 5 there are illustrated various aspects of the area at each end of the apparatus where fiber optic splices would be arranged. In particular, there is illustrated a cross sectional view of one of the ends. The housing includes a door 330, a snap down lid that extends for most, if not all, of the length of the housing and effectively contains and seals the contents. Door 330 might be configured so that it is not removable and cannot fall, off during installation, and is hinged along the top edge 320. However, as will be discussed further with respect to the embodiment of FIGS. 8-10, the door might be detachable from the housing, in which case it might preferably include some loops or other mechanism to keep the door 330 in the same vicinity as the rest of the housing until closing the housing (at which point the loops or keeper strings could be cut or hang slack). Door 330 should completely cover the internal cavity of the housing 200 and have suitable snaps, clips, or captive bolts 340 to both secure the lid and provide some degree of weather resistance. The door 330 would be re-openable for future access, and a weather resistant gasket or seal, such as, an appropriately shaped "O-ring" would be either incorporated into the lid or some other adjoining portion to preclude or minimize the entry of moisture.

The compartments 205 are positioned at or substantially adjacent to the ends, and are the "bulging" sections at each end that cause the smartbone apparatus to loosely resemble a bone in appearance. These compartments are preferably of sufficient size to accommodate a standard splice closure or tray 300, which would be positioned and secured within the housing 200 using guides or clips 310. The tension member 210 is preferably positioned to minimize interference with work being done in the splice trays in the end compartments. The splice tray 300 is preferably configured so that it does not substantially interfere with the splices or the loose fiber routing. The splice tray 300 could be plastic with guides to securely hold fiber optic splices 350 (see FIG. 7). At the termini of the end compartment, the housing defines a recess that receives the gasket 230. This gasket provides the primary function of creating a weather resistant seal and helping to position the cable sheath so that it can be clamped using a clamp 220 (one at each end of the apparatus), which would have the primary purpose of holding the entire cable assembly within the enclosure during the cable access operation. This clamp might be a tie point designed for a plastic tie wrap or more preferably a single point secured keeper that could be swiveled into position and tightened onto the cable sheath.

Figure 6:
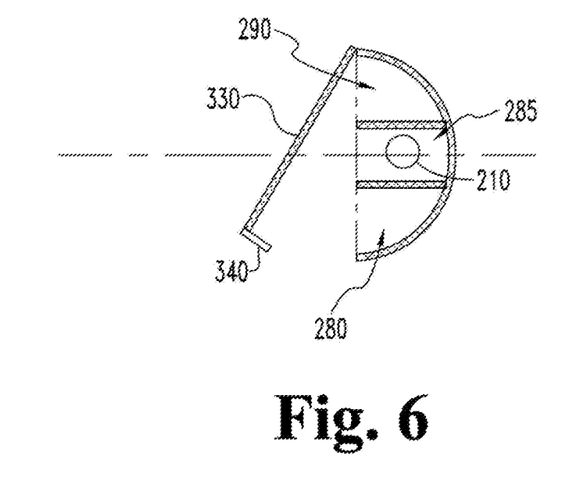
FIG. 6 is a cross sectional view along the 6-6 lines shown in FIG. 4.

With reference to FIG. 6 there are illustrated further details of a portion of the body 203 between the end compartments 205 in which the fiber optic splicing occurs. Specifically, there are preferably at least three channels that run longitudinally between, the two splicing compartments. Cover 330 would also shut this section when closed and secured with clips or other fasteners 340. One channel 280 preferably provides sufficient space to position the portion of the fiber optic cable 250 (see FIG. 7) that is intended to remain undisturbed. Another channel 285 (see FIG. 6) encloses strength- or load bearing member 210 (typically a support rod or structure that holds all the tension). The third channel 290 receives repair fiber 260 (see FIG. 7) installed between the two spaced apart splice trays 300 positioned in end compartments 205 (as illustrated in FIG. 4). It will be understood that even if the length of body portion 203 is minimized (or even zeroed) such, that the end compartments 205 are nearly adjacent, the splice trays should be spaced apart so that there is enough tail in the fiber to reach down into the fiber splicing equipment. It will also be understood, however, that while preferable, it is not necessary for the housing 200 to include multiple channels or (open) chambers between the end compartments 205. For example, the body section 203 might be a single channel that includes the undisturbed fibers, repair fibers and tension member. Alternatively, it is contemplated as within the scope of the invention that the body portion 203 of the housing 200 might only define two channels, one channel receiving, for example, the repair fibers, and the other channel the undisturbed fibers and the tension member. Each channel would preferably have means (either clips or cable tie points) to gently secure loose fiber tubes while the cover is open.

Referring again to FIG. 3, ADSS cable is fastened to smartbone apparatus 120. Such attachment might preferably occur via a preformed wire deadend 160 connected at an attachment position 180 (for example, a steel eyelet). Between deadends 160 and 170, the ADSS cable is inserted into the enclosure. The outer sheath of the slack portion of the fiber optic cable would be removed and discarded to gain access to the cable's internal fibers and strength members. The cable would then be positioned so that the point where the outer sheath is removed is preferably positioned entirely inside the housing 200.

Figure 7:
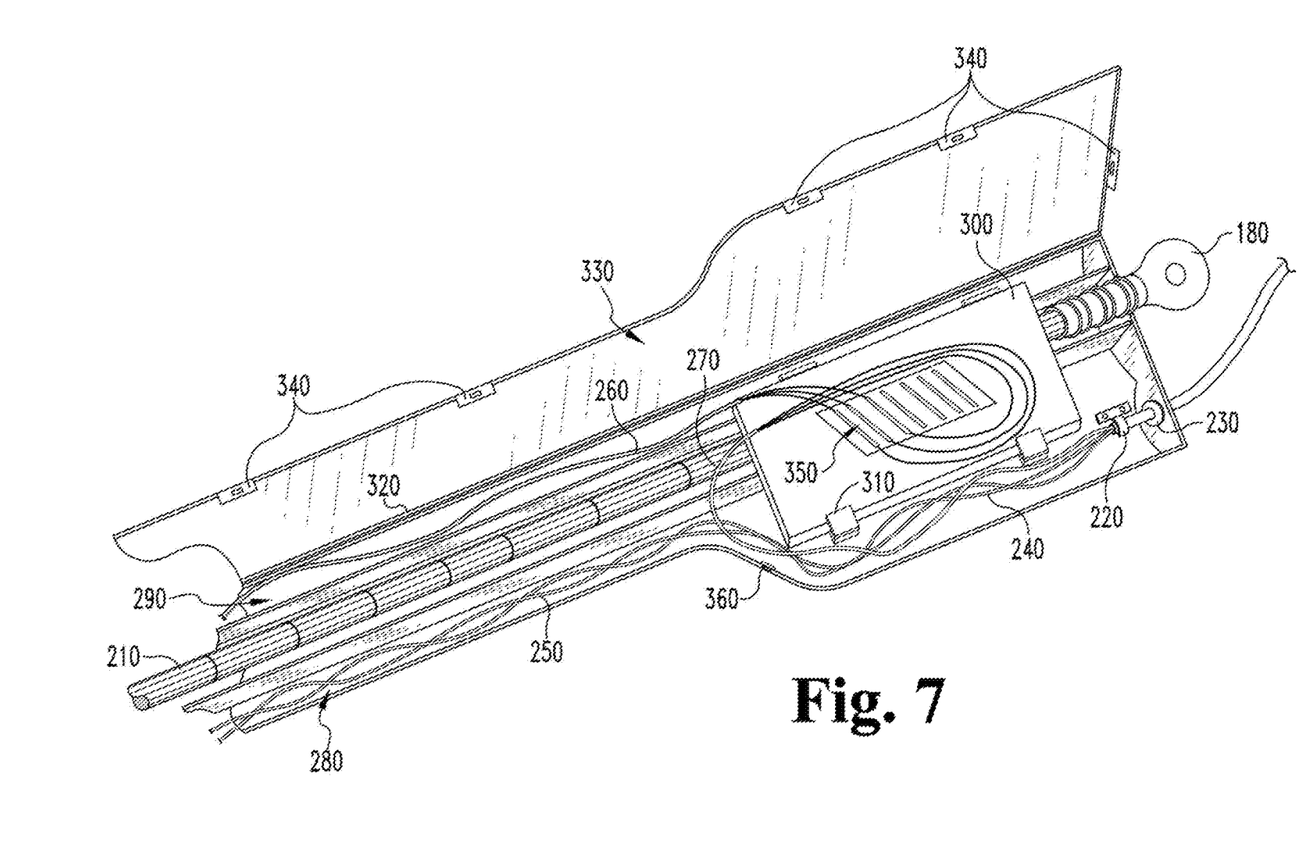
FIG. 7 illustrates further aspects of the splice tray portion of the apparatus of FIG. 4.

With reference to FIG. 7, the cable and/or the strength members (for example, the fiberglass strands that are interwoven into the ADSS cable) might be secured via a clamp 220 and sealed using gasket 230. FIG. 7 illustrates one-half of the apparatus. The other half is preferably a substantially mirror image of FIG. 7. With the cable secured in the smartbone apparatus, the internal fibers 240 would be separated into two groups: the fibers 250 that would not be disturbed and the fibers 270 to be accessed and/or repaired. The fibers 250 designated to continue through the apparatus undisturbed might be positioned in channel 280. The fibers 270 that are designated for splicing and/or repair would be cut, preferably mid-way between clamps 220 at each end, and routed into the respective splicing trays 300 at each end of the apparatus. The undisturbed fibers would be exposed but unbroken inside the enclosure, and would rejoin the cable 140 (see FIG. 3) at the opposing end in a reverse manner.

A form of clam shell or otherwise closable housing (such as a separate lid that is later attached) is preferred since the cable is typically not severed as is the case with existing splice closures for repair. Instead, there is preferably some form of lid, rotatable or otherwise (such as a separate lid that is later attached), that may be shut and used to prevent outside environmental conditions from damaging the exposed contents of the ADSS fiber optic cable. The housing and/or lid should include a gasket, seal, O-ring, etc. to prevent or minimize the entry of moisture that might contact the exposed cable contents. While the snap fit features illustrated in, for example, FIG. 7, might be used, the door 330 is preferably shut by a more reliable clamping mechanism. For example, as is discussed below and illustrated in FIGS. 8-10, the lid might include captive nuts that align with threaded bolts and nuts molded into the body of the lower portion of the housing. When the lid is closed, the nuts can then be tightened to apply sufficient force to provide adequate weather resistance.

In one application for damaged fibers, the point of damage is preferably positioned near the center of the apparatus. Thus, the damaged fibers 270 might be cut and have roughly an equal length of fiber to pull back into each end for splicing to repair fibers 260. Both the damaged fibers and the repair fibers would be routed into the splicing tray 300, where the protective buffer tubes would be removed and the bare fibers exposed. Each fiber would be spliced to a repair fiber using, for example, traditional fusion splicing. The splices 350 are securely positioned in splice tray 300, and the repair fibers 260 are routed through channel 290. At the opposing end compartment 205 the repair fibers 260 are spliced to the corresponding fibers in a similar manner, thus rejoining the whole cable. It will be understood that in some repair applications the repair fibers 260 might preferably already be present in the apparatus so that the installer need only install the damaged fibers 270 in the respective splice tray 300 of each end compartment 205. It will be further understood by those of ordinary skill in the art that typically the installer would not run just a single "repair fiber", since they are usually grouped into buffer tubes of 6 or 12 fibers. If there were only one fiber damaged, an installer would commonly route an entire buffer tube of 6 or 12 fibers through channel 290 and splice all of the fibers in that buffer tube.

In another application wherein designated fibers need to be accessed within an ADSS cable system, the fibers 270 might instead or also include fibers to be spliced to secondary fiber optic cables. In a similar manner, the splices 350 would be secured in splice tray 300. In this embodiment, no repair fiber 260 would be required, as fiber optic lines for new cable would enter the enclosure via a separate opening 360 or through gasket 230 if practical and attach with a bail or similar device to the body of the housing 200 via mounting hole 190 or to the eyelet 180. Additionally, it will be understood that in some applications one or more of the incoming fibers might be routed through a splitter with the output including one fiber that is routed through, or acts as, the repair fiber 260 and other fibers that connect through opening 360 with the new cable that might represent an extension of service by the service provider.

In yet another embodiment, the apparatus can be mounted to a pole or structure using mounting hole 190, which is of sufficient size to accommodate pole mounting hardware and is surrounded by an internal structural member that is preferably clamped, pressed or welded to strength member 210. This would give the installer versatility in the location of mounting, depending on where the cable is damaged.

Figure 8:
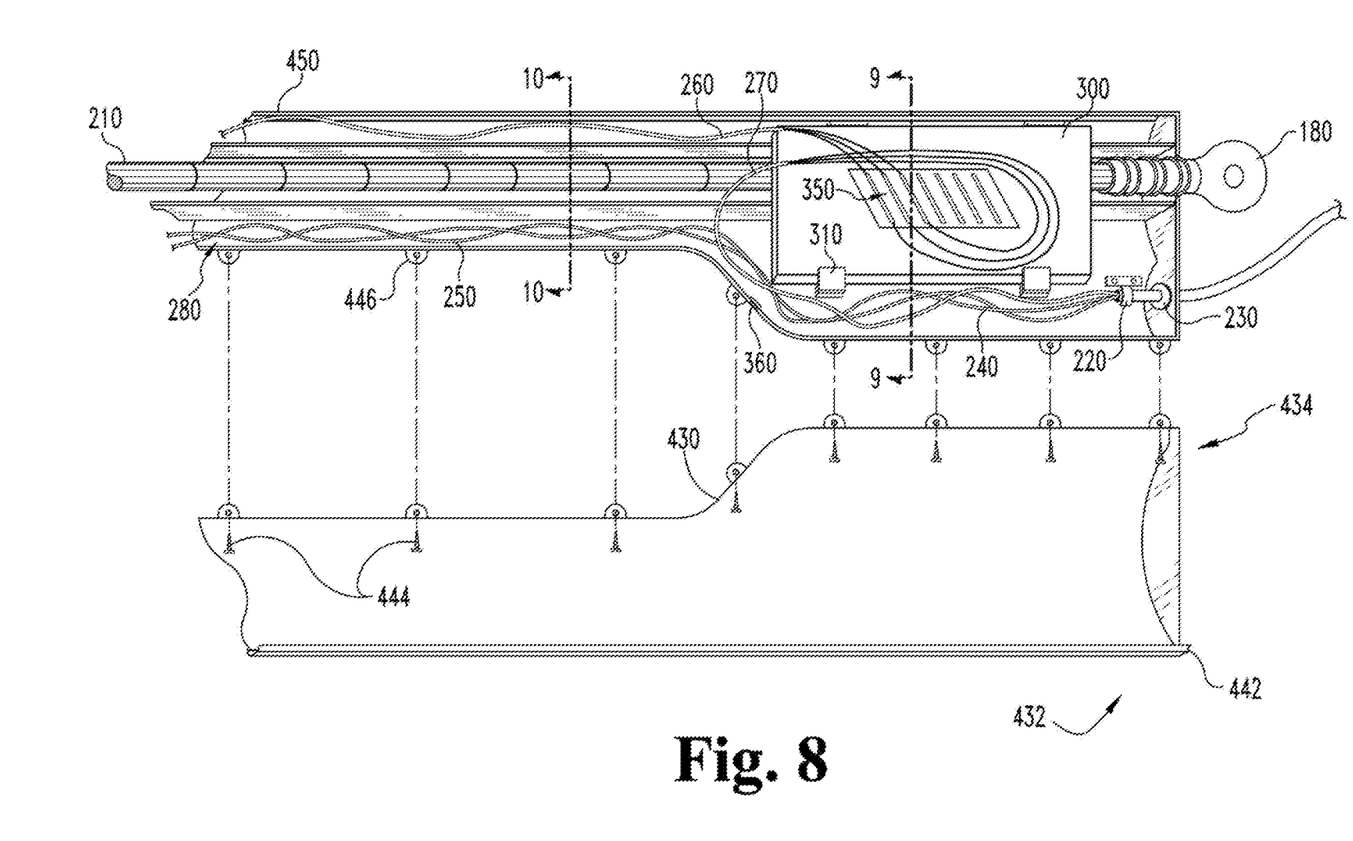
FIG. 8 illustrates an embodiment similar to FIG. 3 but having a separate attachable lid rather than a hinged lid.
Figure 9:
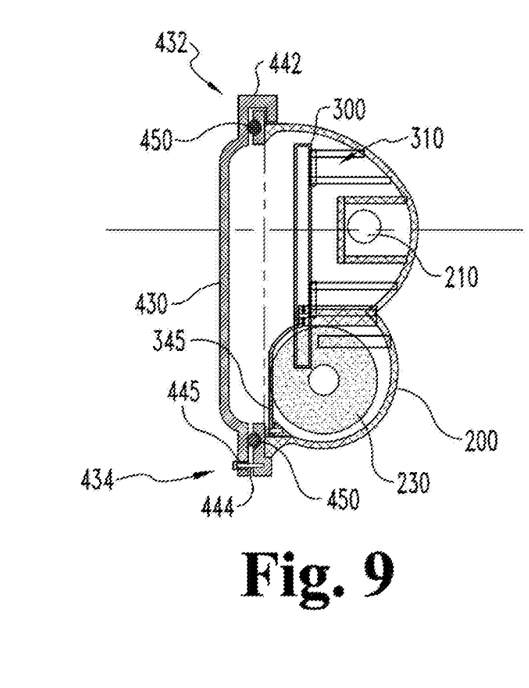
FIG. 9 is a cross sectional view along the 9-9 lines shown in FIG. 8.
Figure 10:
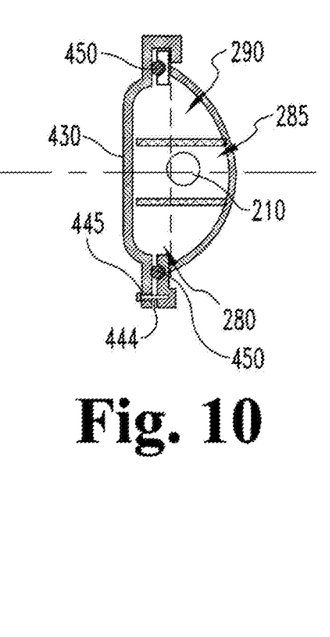
FIG. 10 is a cross sectional view along the 10-10 lines shown in FIG. 8.

With reference to FIGS. 8-10 there are illustrated aspects of another embodiment similar to the embodiment of the prior figures in which like reference numerals are used to designate common features. The embodiment of FIGS. 8-10 has a separate closure lid or cover 430 that is to be attached to form a weather resistant housing. Removable/attachable closure lid 430 extends along the length of the housing and is secured with fasteners 444 along edge 434. The closure lid 430, when pressed by fasteners 444, interacts with a seal 450 on the internal perimeter of the open housing. Area 432 is the portion of the closure lid 430 that is positioned substantially adjacent to first edge of the housing. Area 434 (see FIG. 9) is positioned substantially adjacent to a second edge of the housing. Lid 430 is a clamp over design 442 such than when the cover 430 is attached it should press or pinch on the (likely but not limited to rubber) seal 450 to provide weather resistance to outside environmental conditions. Captive fasteners 444 pass through openings 445 in lid 430 and securely tighten into threaded nuts 446 with threading that matches the bolts 444.

Figure 11:
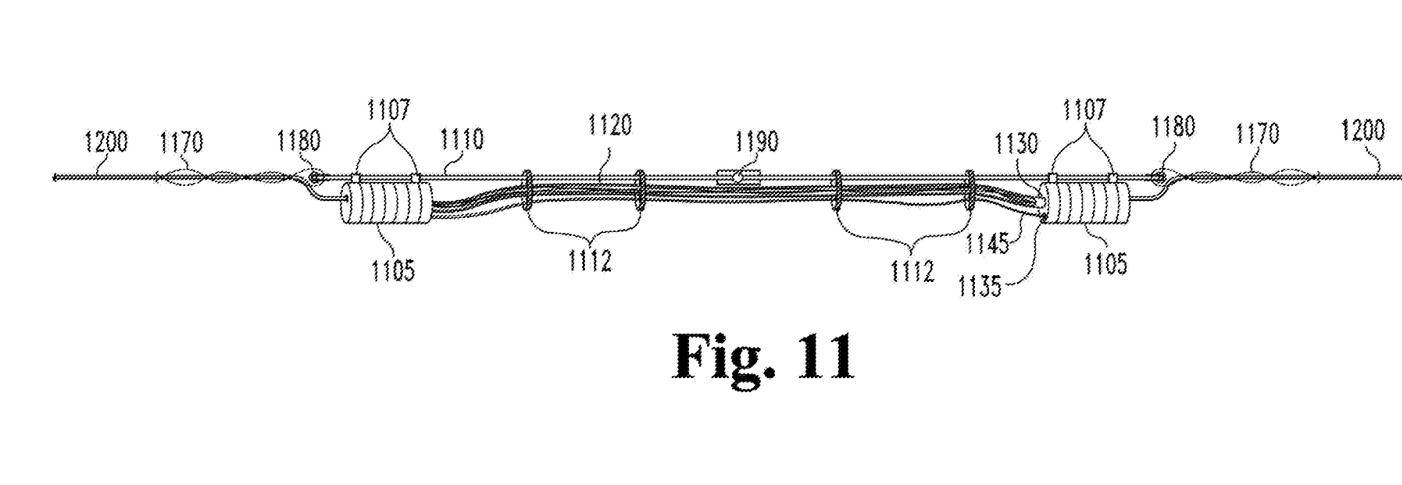
FIG. 11 illustrates another embodiment of two spaced apart splicing compartments separated by a weather proof channel for receiving unsheathed fiber optic lines.

With reference to FIG. 11 there are illustrated various features of another embodiment of the present invention. As previously discussed, the embodiments of FIGS. 1-10 are illustrated as including a tension member that is preferably, but not necessarily, within the housing. Additionally, it was also understood that the housing itself could be formed with sufficient strength to act as the tension member, thus obviating the need for a separate component. For the embodiment of FIG. 11, however, it will be understood that a separate tension member is necessary. Again, however, the embodiment of FIG. 11 permits an ADSS fiber to be repaired, or internal fibers accessed for expansion of services, without disturbing other in-use fiber. In brief summary, the embodiment of FIG. 11 includes two splice compartments 1105 that are spaced apart, a tension member 1110, and a "sleeve" 1120 that encloses an intervening volume between the spaced apart closable compartments. As with prior embodiments, the tension member 1110 could be, for example, a fiberglass rod or a metal or even an aramid cable. If desired the tension member might include a mounting bracket 1190 thereon, similar to the mounting bracket 190 discussed with respect to prior embodiments. The sleeve 1120 encloses the unsheathed fiber optic cable and slips into or otherwise connects to each of the end compartments 1105 to provide a weather resistant enclosed volume to receive the unsheathed fiber optic cable.

As illustrated in FIG. 11, the smartbone is split into two separate splice compartments 1105 that are each closable to provide a weather resistant internal volume that will include splice trays (not illustrated in FIG. 11) similar or identical to the splice trays discussed with respect to prior embodiments. In the embodiment of FIG. 11, however, the channel or channels between the two end compartments 1105 are not an integral part of a housing. Instead, the channel or channels are defined by a preferably separable and possibly expandable weatherproof sleeve 1120. The sleeve 1120 might clam shell or otherwise wrap around unsheathed buffer tubes. The entire assembly is attached or integrated with the tension member 1110, which would serve the same purpose (to carry longitudinal loading of the line). For example, as illustrated in FIG. 11, the end compartments 1105 are attached to tension member 1110 by clips 1107. Similarly, the sleeve 1120 is attached to the tension member 1110 by loops or clamps 1112. The tension member 1110 could have a similar mounting bracket 1190 for structure mounting, and could be fiberglass or steel cable (although metallic components would jeopardize the dielectric nature of the apparatus). The tension member includes end connectors 1180 that are illustrated in FIG. 11 as eyelets, though alternative structures are also contemplated as within the scope of the invention.

The sleeve 1120 that defines the channel(s) between the two end compartments 1105 could be made of plastic, vinyl, or any other material in such a manner that it would protect the exposed (unsheathed) buffer tubes from outside environmental conditions such as water and UV light. The sleeve is a segment that defines a volume connecting the two end compartments 1105 and preferably includes weatherproof fittings or seal 1130 at the egress of each end compartment 1105. As previously noted, the sleeve 1120 could be rigid or flexible, and could be secured to the tension member 1110 with keepers, tape, or plastic ties 1112 as desired.

While the exposed uncut buffer tubes, would need to be routed through the sleeve 1120, the fiber used to repair the damage could either be routed within the same connector segment, omit could be run external to the channel and enter through a separate weather resistant end compartment entrance 1135. If routed externally and adjacent, the repair fiber 1145 would need to be weather resistant, and would preferably also include a weather resistant seal as it enters the end compartment 1105 (similar to the seal provided by gasket 230 discussed with respect to prior embodiments). In cases of network expansion, the repair fiber is inapplicable, and those egress ports might be used by the exiting expansion fiber.

An advantage of the FIG. 11 embodiment is that the length of the connecting channel within sleeve 1120 might be varied to address situations in which the fiber optic cable has multiple damage locations several feet apart (thus not easily captured within the fixed length embodiments of FIGS. 1-10). The method for installing the apparatus of FIG. 11 is substantially the same, but, there would be some field assembly of the components (comprising the two splice end compartments 1105, the tension member 1110, and the connector).

FIG. 11 illustrates the ADSS cable 1200 connected via preform gripping style connectors 1170. It is understood that it is contemplated as within the scope of the invention that mechanical wedge connectors or other bail type connectors could be used. Similarly, other variations or refinements discussed with respect to prior embodiments might be equally applicable to the embodiment of FIG. 11, the notable exception being that the housing cannot serve as the tension member and thus a separate tension component must be present.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus for accessing select fibers in an All-Dielectric Self-Supporting (ADSS) fiber optic cable, comprising:
   a housing extending from a first end to a second end, wherein the housing is weather resistant when closed by a hinged lid that opens to permit access to an internal cavity of the housing;
   a first fiber optic splice tray positioned within the housing closer to the first end than to the second end;
   a second fiber optic splice tray positioned within the housing and spaced apart from the first splice tray and closer to the second end than to the first end;
   a load-bearing member extending through the housing and including a first mechanical connector external to the housing near the first end and a second mechanical connector external to the housing near the second end, wherein at least one of the first mechanical connector and the second mechanical connector is adapted to connect to ADSS fiber optic cable.

2. The apparatus of claim 1, wherein the housing has an axial length between the first end and the second that is at least six feet.

3. The apparatus of claim 2, wherein the load-bearing member is a fiberglass rod.

4. The apparatus of claim 2, wherein each mechanical connector is a closed loop that is attached to the load-bearing member by internal threading that corresponds to external threading present on at least a portion of the load-bearing member.

5. The apparatus of claim 1, wherein the housing defines a first end compartment at the first end in which is the first fiber optic splice tray is positioned and a second end compartment at the second end in which the second fiber optic splice tray is positioned.

6. The apparatus of claim 5, wherein the housing further defines a body portion connecting the first end compartment to the second end compartment.

7. The apparatus of claim 6, wherein the body portion defines at least two different chambers that are each open to both the first end compartment and the second end compartment.

8. The apparatus of claim 7, wherein the body portion defines a first chamber, a second chamber, and a third chamber, and wherein the tension member is positioned within the first chamber.

9. The apparatus of claim 8, wherein the first splice tray is connected to the second splice tray by a plurality of repair fibers, and wherein the repair fibers are positioned within the second chamber.

10. The apparatus of claim 6, wherein the housing defines a mounting hole in the body portion.

11. The apparatus of claim 10, wherein the lid is detachable from the housing to permit access to an internal cavity of the housing.

12. An apparatus for accessing select fibers in an All-Dielectric Self-Supporting (ADSS) fiber optic cable, comprising:
   a housing extending from a first end to a second end;
   a first fiber optic splice tray positioned within the housing closer to the first end than to the second end;
   a second fiber optic splice tray positioned within the housing and spaced apart from the first splice tray and closer to the second end than to the first end;
   a load-bearing member extending through the housing and including a first mechanical connector external to the housing near the first end and a second mechanical connector external to the housing near the second end, wherein at least one of the first mechanical connector and the second mechanical connector is adapted to connect to ADSS fiber optic cable.

13. The apparatus of claim 12, wherein the housing has an axial length between the first end and the second end that is at least six feet.

14. The apparatus of claim 13, wherein the housing is weather resistant when closed by a hinged lid that opens to permit access to an internal cavity of the housing.

15. The apparatus of claim 12, wherein the load-bearing member is a fiberglass rod.

16. The apparatus of claim 12, wherein the first mechanical connector is a closed loop and the second mechanical connector is a closed loop.

17. The apparatus of claim 12, wherein the first splice tray is connected to the second splice tray by a plurality of repair fibers.

* * * * *